United States Patent (10) Patent No.: US 10,425,699 B2
Kitazato (45) Date of Patent: Sep. 24, 2019

(54) CONTROLLING EXECUTION OF AN APPLICATION LINKED WITH RECEIVED CONTENTS

(71) Applicant: SONY CORPORATION, Tokyo (JP)

(72) Inventor: Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/428,342

(22) PCT Filed: Sep. 6, 2013

(86) PCT No.: PCT/JP2013/074014
§ 371 (c)(1),
(2) Date: Mar. 13, 2015

(87) PCT Pub. No.: WO2014/045893
PCT Pub. Date: Mar. 27, 2014

(65) Prior Publication Data
US 2015/0237417 A1 Aug. 20, 2015

(30) Foreign Application Priority Data
Sep. 20, 2012 (JP) .................................. 2012-207207

(51) Int. Cl.
*H04N 5/445* (2011.01)
*H04N 21/81* (2011.01)
(Continued)

(52) U.S. Cl.
CPC ......... *H04N 21/8173* (2013.01); *H04N 7/165* (2013.01); *H04N 21/2541* (2013.01);
(Continued)

(58) Field of Classification Search
CPC ......... H04N 21/2665; H04N 21/64322; H04N 21/4622
(Continued)

(56) References Cited

U.S. PATENT DOCUMENTS

2007/0266037 A1* 11/2007 Terry .................... G06F 3/0607
2008/0036727 A1* 2/2008 Muto ................... G09G 3/3611
345/101
(Continued)

FOREIGN PATENT DOCUMENTS

CN 102870429 A 1/2013
EP 2514204 A 10/2012
(Continued)

OTHER PUBLICATIONS

Japanese Office Action corresponding to Japanese Patent Application No. 2014-0256991, Dispatch No. 145794, dated Mar. 26, 2015.
(Continued)

*Primary Examiner* — Randy A Flynn
*Assistant Examiner* — Sahar Aqil Riaz
(74) *Attorney, Agent, or Firm* — Chip Law Group

(57) ABSTRACT

The present disclosure relates to a receiving device, a receiving method, a broadcasting device, a broadcasting method, a program, and a link application control system allowing control of receiving device control functions of a link app on the broadcasting side.
A link application control system according to a third aspect of the present disclosure includes the broadcasting device that has a supply unit for supplying to the receiving device application control information concerning a link application executable with reception of the contents by the receiving device, and the receiving device that has an application executing unit for executing a link application that may refer to an image of the received contents and change a layout of a screen, and an application control unit for controlling the application executing unit based on the application control information to limit an action of the link application. The present disclosure is applicable to a television broadcasting system.

12 Claims, 17 Drawing Sheets

(51) Int. Cl.

| | | |
|---|---|---|
| *H04N 21/4367* | (2011.01) | |
| *H04N 21/431* | (2011.01) | |
| *H04N 21/434* | (2011.01) | |
| *H04N 7/16* | (2011.01) | |
| *H04N 21/254* | (2011.01) | |
| *H04N 21/2665* | (2011.01) | |
| *H04N 21/462* | (2011.01) | |
| *H04N 21/4623* | (2011.01) | |
| *H04N 21/4627* | (2011.01) | |
| *H04N 21/478* | (2011.01) | |
| *H04N 21/61* | (2011.01) | |
| *H04N 21/643* | (2011.01) | |
| *H04N 21/845* | (2011.01) | |
| *H04N 21/858* | (2011.01) | |

(52) U.S. Cl.
 CPC ..... *H04N 21/2665* (2013.01); *H04N 21/4312* (2013.01); *H04N 21/4348* (2013.01); *H04N 21/4367* (2013.01); *H04N 21/4622* (2013.01); *H04N 21/4623* (2013.01); *H04N 21/4627* (2013.01); *H04N 21/478* (2013.01); *H04N 21/6125* (2013.01); *H04N 21/6175* (2013.01); *H04N 21/64322* (2013.01); *H04N 21/8455* (2013.01); *H04N 21/858* (2013.01)

(58) Field of Classification Search
 USPC ..................................................... 725/38, 40
 See application file for complete search history.

(56) References Cited

U.S. PATENT DOCUMENTS

| | | | | |
|---|---|---|---|---|
| 2009/0249381 | A1* | 10/2009 | White | G11B 7/005 720/718 |
| 2010/0122189 | A1* | 5/2010 | Kenagy | H04L 65/604 715/764 |
| 2012/0291064 | A1* | 11/2012 | Kitazato | H04N 21/4305 725/32 |
| 2013/0077060 | A1* | 3/2013 | Sakai | H04N 9/3185 353/69 |
| 2014/0059478 | A1* | 2/2014 | Dearman | G06F 3/04886 715/781 |
| 2014/0129942 | A1* | 5/2014 | Rathod | H04N 21/44222 715/720 |
| 2014/0139736 | A1* | 5/2014 | McCoy | H04N 7/0122 348/445 |
| 2015/0135160 | A1* | 5/2015 | Gauvin | H04W 4/001 717/109 |

FOREIGN PATENT DOCUMENTS

| | | | | |
|---|---|---|---|---|
| JP | 2010004498 | A | 1/2010 | |
| JP | 2011124958 | A | 6/2011 | |
| JP | WO 2011074218 | A2 * | 6/2011 | ......... H04N 21/4305 |
| JP | 2012-248908 | A | 12/2012 | |
| JP | 2012257230 | A | 12/2012 | |
| JP | P5725390 | B1 | 4/2015 | |
| JP | 2015097396 | A | 5/2015 | |
| JP | 2015097397 | A | 5/2015 | |
| JP | 2012257234 | A | 12/2015 | |
| KR | 10-2012-0114251 | A | 10/2012 | |
| WO | 2011074218 | A2 | 6/2011 | |
| WO | 2012-157767 | A | 11/2012 | |

OTHER PUBLICATIONS

Hiroyuki Hamada et.al., Outline of Basic System of Hybridcast, NHK Science & Technology Research Laboratories R&D, Japan, May 15, 2012, No. 133, p. 10-19.

Hisakazu Katoh, Deployment of Hybridcast, NHK Science & Technology Research Laboratories R&D, Japan, Sep. 15, 2012, No. 135, p. 14-29.

Tomohide Take et al., Technology Supporting Hybridcast, NHK Science & Technology Research Laboratories R&D, Japan, May 15, 2012, No. 133, p. 20-27.

Hisakazu Kato, Aim at Hybridcast <Effort for Broadcasting Communications Cooperation in Science & Technology Research Laboratories>, NHK Science & Technology Research Laboratories R&D, Japan, Sep. 15, 2010, No. 123, p. 56-63.

Japanese Office Action corresponding to Japanese Patent Application No. 2014-0256992, Dispatch No. 145799, dated Mar. 26, 2015.

Japanese Office Action corresponding to Japanese Patent Application No. 2014-0256993, Dispatch No. 145804, dated Mar. 26, 2015.

Office Action received for Japanese patent application No. 2014-536743, dated Apr. 5, 2016, 14 pages of Office Action including 7 pages of English translation.

ETSI, "Hybrid Broadcast Broadband TV", ETSI Technical Specification 102 796, version 1.1.1, 2010, 75 pages.

Extended European Search Report received for European Patent Application No. 13839399.6, dated Mar. 2, 2016, 9 pages.

Kazuhiro Otsuki et al., "A Method of Controlling Presentation for Applications in Hybridcast", IEEE International Conference on Consumer Electronics (ICCE), 2012, 2 pages.

\* cited by examiner

FIG. 6  50

| | ITEM NAME | REQUIRED OR OPTIONAL | DESCRIPTION |
|---|---|---|---|
| 51 | APPLICATION TYPE | REQUIRED | APPLICATION TYPE FIXED TO HTML 5 |
| 52 | ENTERPRISE ID | REQUIRED | APPLICATION ENTERPRISE |
| 53 | APPLICATION ID | REQUIRED | UNIQUE APPLICATION IDENTIFIER IN PARTICULAR ENTERPRISE |
| 54 | APPLICATION CONTROL COMMAND | REQUIRED | CONTROL ACTION FOR TARGET APPLICATION · AUTOMATIC START · END · PREFETCH · ACTION PERMISSION |
| 55 | APPLICATION SPECIFICATION VERSION | REQUIRED | VERSION NO. FOR EACH APPLICATION TYPE |
| 56 | RECEIVING DEVICE REQUIRING FUNCTION PROFILE | OPTIONAL (DEFAULT ASSUMPTION INCLUDED) | PROFILE VALUE INDICATING RECEIVING DEVICE FUNCTION REQUIRED BY APPLICATION. |
| 57 | APPLICATION URL | OPTIONAL (REQUIRED DEPENDING ON COMMAND) | APPLICATION ACQUISITION URL |
| 58 | APPLICATION BOUNDARY | OPTIONAL (DEFAULT ASSUMPTION INCLUDED) | APPLICATION OPERATION RANGE |
| 59 | APPLICATION SYSTEM PRIORITY | OPTIONAL (REQUIRED DEPENDING ON COMMAND) | PRIORITY OVER OTHER Auto-start APPLICATION TYPES (INCLUDING EXISTING DATA BROADCASTING) |
| 60 | APPLICATION BROADCASTING LINK RANGE | OPTIONAL (REQUIRED DEPENDING ON COMMAND) | APPLICATION LINK OPERATION RANGE Service_bound/Provider_bound/U_bound |
| 61 | PERMISSION INFORMATION | OPTIONAL | PERMITTED BROADCASTING-RELATED FUNCTION OF APPLICATION |
| 62 | SERVER ACCESS DISPERSION PARAMETER | OPTIONAL | CONTROL PARAMETER FOR DISPERSING SERVER ACCESS |

FIG. 8

| IMAGE REFERENCE | BROADCASTING START TYPE LINK APP PERMISSION LEVEL | NON-BROADCASTING START TYPE LINK APP PERMISSION LEVEL | LAYOUT |
|---|---|---|---|
| 00 | (PROHIBITED STATE) | BROADCASTING REFERENCE NG | NO DISPLAY |
| 01 | BROADCASTING FULL SCREEN/APP NO DISPLAY | BROADCASTING FULL SCREEN/APP NO DISPLAY, OR NO BROADCASTING REFERENCE | PROGRAM |
| 10 | BROADCASTING SUB-SCREEN REFERENCE | BROADCASTING SUB-SCREEN REFERENCE OR NO BROADCASTING REFERENCE | PROGRAM / APP |
| 11 | Overlay, SUB-SCREEN DISPLAY PERMITTED | Overlay, SUB-SCREEN DISPLAY, NO BROADCASTING REFERENCE | APP / PROGRAM, APP / PROGRAM |

FIG. 13

| | ITEM NAME | REQUIRED OR OPTIONAL | DESCRIPTION |
|---|---|---|---|
| 51 | APPLICATION TYPE | REQUIRED | APPLICATION TYPE FIXED TO HTML 5 |
| 52 | ENTERPRISE ID | REQUIRED | APPLICATION ENTERPRISE |
| 53 | APPLICATION ID | REQUIRED | UNIQUE APPLICATION IDENTIFIER IN PARTICULAR ENTERPRISE |
| 54 | APPLICATION CONTROL COMMAND | REQUIRED | CONTROL ACTION FOR TARGET APPLICATION<br>· AUTOMATIC START    · END<br>· PREFETCH              · ACTION PERMISSION |
| 55 | APPLICATION SPECIFICATION VERSION | REQUIRED | VERSION NO. FOR EACH APPLICATION TYPE |
| 56 | RECEIVING DEVICE REQUIRING FUNCTION PROFILE | OPTIONAL<br>(DEFAULT ASSUMPTION INCLUDED) | PROFILE VALUE INDICATING RECEIVING DEVICE FUNCTION REQUIRED BY APPLICATION. |
| 57 | APPLICATION URL | OPTIONAL<br>(REQUIRED DEPENDING ON COMMAND) | APPLICATION ACQUISITION URL |
| 59 | APPLICATION SYSTEM PRIORITY | OPTIONAL<br>(DEFAULT ASSUMPTION INCLUDED) | PRIORITY OVER OTHER Auto-start APPLICATION TYPES (INCLUDING EXISTING DATA BROADCASTING) |
| 60 | APPLICATION BROADCASTING LINK RANGE | OPTIONAL<br>(REQUIRED DEPENDING ON COMMAND) | APPLICATION LINK OPERATION RANGE<br>Service_bound/Provider_bound/U_bound |
| 101 | APPLICATION BOUNDARY AND DOMAIN UNIT PERMISSION INFORMATION | OPTIONAL | DOMAINS IN APPLICATION BOUNDARY AND PERMITTED FUNCTION FOR EACH DOMAIN |
| 62 | SERVER ACCESS DISPERSION PARAMETER | OPTIONAL | CONTROL PARAMETER FOR DISPERSING SERVER ACCESS |

FIG. 14

| DATA STRUCTURE | BIT NUMBER | BIT STRING EXPRESSION |
|---|---|---|
| application_information_section( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   application_type | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   common_descriptors_length | 12 | uimsbf |
|   for (i=0; i<N; i++) { | | |
|     descriptor () | | |
|   } | | |
|   reserved_future_use | 4 | bslbf |
|   application_loop_length | 12 | uimsbf |
|   for (i=0; i<N; i++) { | | |
|     application_identifier () | | |
|     application_control_code | 8 | uimsbf |
|     reserved_future_use | 4 | bslbf |
|     application_descvriptors_loop_length | 12 | uimsbf |
|     for (j=0; j<M; j++) { | | |
|       descriptor () | | |
|     } | | |
|   } | | |
|   CRC_32 | 32 | rpchof |
| } | | |

FIG. 15

| DATA STRUCTURE | BIT NUMBER | BIT STRING EXPRESSION |
|---|---|---|
| application_boundary_plus_permission_descriptor ( ) { | | |
|   descriptor_tag | 8 | uimsbf |
|   descriptor_length | 8 | uimsbf |
|   boundarylees_flag | 1 | bslbf |
|   reserved_futureuse | 7 | bslbf |
|   boundary_extension_count | 8 | uimsbf |
|   for (j=0 ; j<boundary_extension_counti++) { | | |
|     boundary_extension_length | 8 | uimsbf |
|     for [k=0 ; k<boundary_extension_length ; k ++ ) { | | |
|       boundary_extension_byte | 8 | uimsbf |
|     } | | |
|   permission_bitmap_count | 8 | uimsbf |
|   for (k=0 ; k<permission_bitmap_count ; k ++) { | | |
|     permission_bitmap | 16 | bslbf |
|   } | | |
| } | | |

CONTROLLING EXECUTION OF AN APPLICATION LINKED WITH RECEIVED CONTENTS

TECHNICAL FIELD

The present disclosure relates to a receiving device, a receiving method, a broadcasting device, a broadcasting method, a program, and a link application control system, and more particularly to a receiving device, a receiving method, a broadcasting device, a broadcasting method, a program, and a link application control system suited for use for operating a predetermined application program with link between the predetermined application and a television program.

BACKGROUND ART

Digital television broadcasting includes not only television program (hereinafter abbreviated as program) broadcasting services, but also services called data broadcasting (for example see Patent Document 1). The data broadcasting is utilized to supply predetermined application programs (hereinafter abbreviated as applications or apps where appropriate) to the receiving side and execute the supplied applications on the receiving side with links between application programs and programs.

Conventionally, applications linked with programs (hereinafter referred to as link applications or link apps) are created on the broadcasting station side which broadcasts programs, and supplied to receiving devices together with programs. However, such a service is expected to be realized in the future which will allow ordinary app enterprises not related with programs to create link apps, and supply the created link apps to receiving devices by certain methods to execute the link apps on the receiving devices side.

CITATION LIST

Patent Document

Patent Document 1: JP 2006-50237 A

SUMMARY OF THE INVENTION

Problems to be Solved by the Invention

Link apps can determine layouts of screens output from receiving devices, refer to metadata of programs, and control actions concerning reception of receiving device (such as channel selection) (These actions are collectively referred to as receiving device control functions).

Accordingly, when ordinary app enterprises create link apps based on some intention, or when malfunction of link apps is caused by the presence of bugs, there may arise such problems as no output of images or voices of programs, and display of information containing slanderous contents for programs together with the programs.

Accordingly, it is preferable that the receiving device control functions of link apps are controlled on the broadcasting side so as to prevent the foregoing problems which may be caused when creation of the link apps is allowed by ordinary app enterprises.

The present disclosure has been developed to solve the aforementioned problems by providing a mechanism which allows control of receiving device control functions of link apps on the broadcasting side.

Solutions to Problems

A receiving device which receives contents broadcasted via a broadcasting network according to a first aspect of the present disclosure includes: an application executing unit that executes a link application that may refer to an image of the received contents and change a layout of a screen; and an application control unit that controls the application executing unit based on application control information on the link application to limit an action of the link application.

The application control unit may analyze the action of the link application prior to start of the link application by the application executing unit, and control the application executing unit based on comparison between the action and permission information contained in the application control information and indicating permission or prohibition of a predetermined action for the link application to limit the start of the link application.

The application control unit may limit switching to web pages under the link application based on switching range information contained in the application control information and indicating a switchable range of web pages under the link application.

The application control unit may limit switching to web pages under the link application, and limit an action of the link application after switching to the switchable range based on switching range information contained in the application control information and indicating a switchable range of web pages under the link application, and on the permission information contained in the application control information and corresponding to each domain as a switching destination.

The application control unit may permit switching of web pages to out of the switchable range indicated by the switching range information under the link application based on switching range excess permission and prohibition information contained in the application control information and indicating permission or prohibition of switching to out of the switchable range indicated by the switching range information under the link application.

The application control unit may permit switching of web pages to out of the switchable range indicated by the switching range information under the link application based on the switching range excess permission and prohibition information contained in the application control information, and limit an action of the link application after switching to out of the switchable range based on the permission information set in common to web pages out of the switchable range indicated by the switching range information.

The application control unit may acquire the broadcasted application control information, or acquire the application control information from a predetermined server.

The permission information may contain an item of image reference indicating a permission level for referring to the image of the received contents and changing the layout of the screen.

The permission information may further include at least one of an item concerning real time channel selection, an item concerning timer channel selection, an item concerning SI reference, an item concerning current channel selection information acquisition, an item concerning NVRAM Read, and an item concerning NVRAM Write.

A receiving method for a receiving device that receives contents broadcasted via a broadcasting network according to the first aspect of the present disclosure includes: an acquiring step that is executed by the receiving device and acquires application control information concerning a link application that may refer to an image of the received contents and change a layout of a screen; and an application control step that is executed by the receiving device and limits an action of the link application based on the acquired application control information.

The first aspect of the present disclosure is directed to a program for causing a computer that receives contents broadcasted via a broadcasting network to function as: an application executing unit that executes a link application that may refer to an image of the received contents and change a layout of a screen; and an application control unit that controls the application executing unit based on application control information on the link application to limit an action of the link application.

According to the first aspect of the present disclosure, the application control information on the link application that may refer to an image of the received contents and change the layout of the screen is acquired, and the action of the link application is limited based on the acquired application control information.

A broadcasting device that broadcasts contents via a broadcasting network according to a second aspect of the disclosure includes: a supply unit that supplies to a receiving device application control information concerning a link application executable with reception of the contents by the receiving device, wherein the application control information includes permission information containing at least an item of image reference indicating a permission level for permitting the link application to refer to the image of the received contents and change the layout of the screen.

The permission information may further include at least one of an item concerning real time channel selection, an item concerning timer channel selection, an item concerning SI reference, an item concerning current channel selection information acquisition, an item concerning NVRAM Read, and an item concerning NVRAM Write.

The application control information may further include switching range information indicating a switchable range of web pages under the link application.

The application control information may further include switching range information indicating a switchable range of web pages under the link application, and the permission information for each domain as a switching destination.

The application control information may further include switching range excess permission and prohibition information indicating permission or prohibition of switching to out of the switchable range indicated by the switching range information under the link application.

A broadcasting method for a broadcasting device that broadcasts contents via a broadcasting network according to the second aspect of the present disclosure includes: a supply step that is executed by the broadcasting device, and supplies to a receiving device application control information concerning a link application executable with reception of the contents by the receiving device, wherein the application control information includes permission information containing at least an item of image reference indicating a permission level for permitting the link application to refer to the image of the received contents and change the layout of the screen.

The second aspect of the present disclosure is directed to a program for causing a computer that broadcasts contents via a broadcasting network to function as: a supply unit that supplies to a receiving device application control information concerning a link application executable with reception of the contents by the receiving device, wherein the application control information includes permission information containing at least an item of image reference indicating a permission level for permitting the link application to refer to the image of the received contents and change the layout of the screen.

According to the second aspect of the present disclosure, the application control information concerning the link application executable with reception of the contents by the receiving device is supplied to the receiving device.

A link application control system according to a third aspect of the present disclosure includes: a broadcasting device that broadcasts contents via a broadcasting network; and a receiving device that receives the broadcasted contents. The broadcasting device includes a supply unit that supplies to the receiving device application control information concerning a link application executable with reception of the contents by the receiving device. The receiving device includes an application executing unit that executes a link application that may refer to an image of the received contents and change a layout of a screen, and an application control unit that controls the application executing unit based on the application control information to limit an action of the link application.

According to the third aspect of the present disclosure, the application control information concerning the link application executable with reception of the contents by the receiving device is supplied from the broadcasting device to the receiving device. In addition, the application control information on the link application that may refer to an image of the received contents and change the layout of the screen is acquired by the receiving device, and the action of the link application is limited based on the acquired application control information.

Effects of the Invention

According to a first aspect of the present disclosure, an action of a link application is limited based on application control information.

According to a second aspect of the present disclosure, an action of a link application on the side of a receiving device is limited based on application control information supplied to the receiving device.

According to a third aspect of the present disclosure, an action of a link application on the side of a receiving device is limited based on application control information supplied from a broadcasting device.

BRIEF DESCRIPTION OF DRAWINGS

FIG. 6 is a figure illustrating items of application control information corresponding to a first embodiment.

FIG. 8 is a figure illustrating image reference of permission information.

FIG. 13 is a figure illustrating items of application control information corresponding to a second embodiment.

FIG. 14 is a figure illustrating an example of a syntax of application control information corresponding to the second embodiment.

FIG. 15 is a figure illustrating an example of a syntax of application boundary and domain unit permission information 101.

MODE FOR CARRYING OUT THE INVENTION

A best mode for carrying out the present disclosure (hereinafter referred to as embodiment) is now described in detail with reference to the drawings.

A first embodiment discussed hereinafter is an example which allows the broadcasting side to control receiving device control functions for each link application. On the other hand, a second embodiment is an example which allows the broadcasting side to control receiving device control functions for each domain of web pages as destinations of switching of link applications (each domain of servers from which data is acquired for reference).

1. First Embodiment

[Configuration Example of Link Application Control System]

Figure 1:
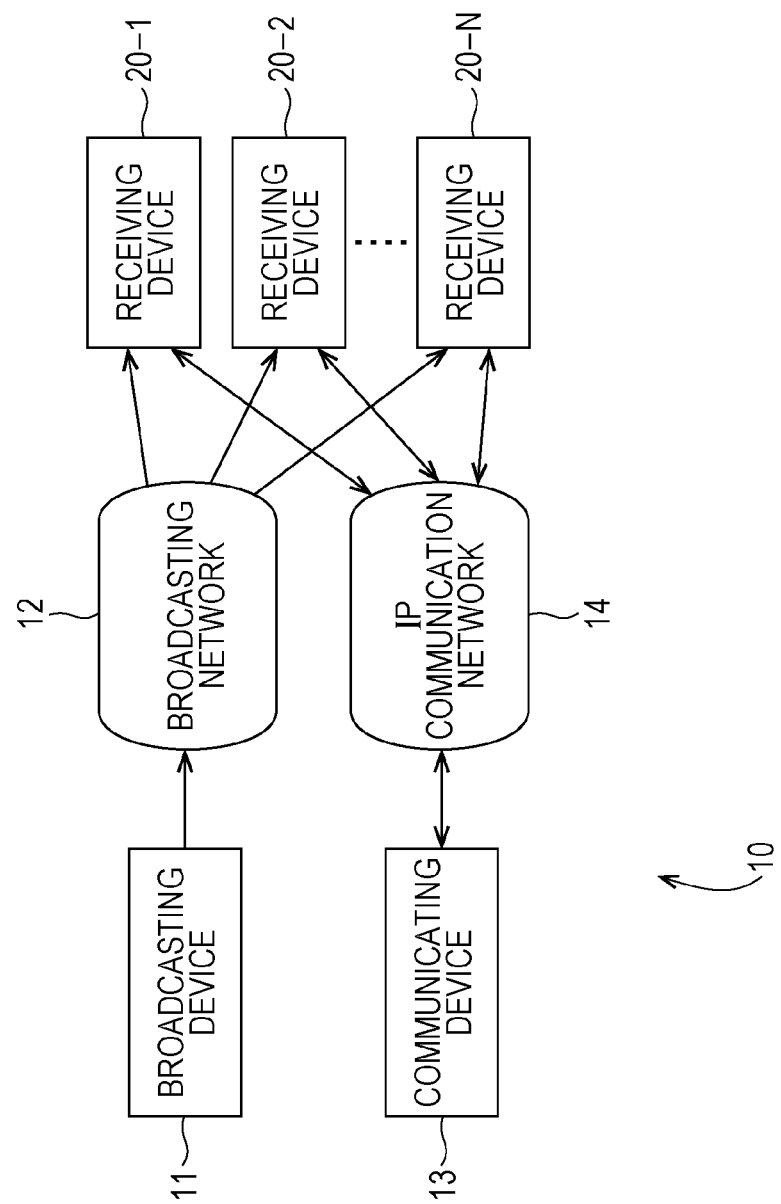
FIG. 1 is a block diagram illustrating a configuration example of a link application control system to which the present disclosure is applied.

FIG. 1 illustrates a link application control system according to an embodiment of the present disclosure. A link application control system 10 illustrated in the figure executes a link application with link between the link application and a program received and displayed on the receiving side.

The link application control system 10 includes a broadcasting device 11, a communicating device 13, and receiving devices 20-1 through 20-N. The receiving devices 20-1 through 20-N are hereinafter collectively referred to as receiving devices 20 when no distinction is particularly needed between the receiving devices 20-1 through 20-N.

The broadcasting device 11 broadcasts broadcasting signals (broadcasting streams) of television broadcasting via a broadcasting network 12 such as a terrestrial digital broadcasting network, a satellite broadcasting network, and a cable television network. The broadcasting streams include video, audio, title and other signals contained in commercial messages in programs, and signals for data broadcasting services. The broadcasting streams further include, as required, application control information containing information as triggers for start and end of link apps, and event messages containing information as triggers for event firing in link apps in execution, and data used for events, for example.

The communicating device 13 is connected with an IP communication network 14 represented by the Internet, and supplies link apps in response to requests from the receiving devices 20 which access the communicating device 13 via the IP communication network 14. Link apps may be supplied to the receiving devices 20 by using data broadcasting signals of broadcasting streams. The application control information and event messages discussed above may be supplied to the receiving devices 20 via the IP communication network 14.

The receiving devices 20 receive broadcasting streams broadcasted from the broadcasting device 11 via the broadcasting network 12, and output images and voices contained in programs or commercial messages to a monitor (not shown) provided downstream. In addition, the receiving devices 20 acquire link apps from the communicating device 13 via the IP communication network 14, and execute the acquired apps.

Each of the receiving devices 20 may be an independent device, or may be contained in a digital television receiver, a video recorder, a personal computer, or a smart phone, for example.

[Configuration Example of Receiving Device 20]

Figure 2:
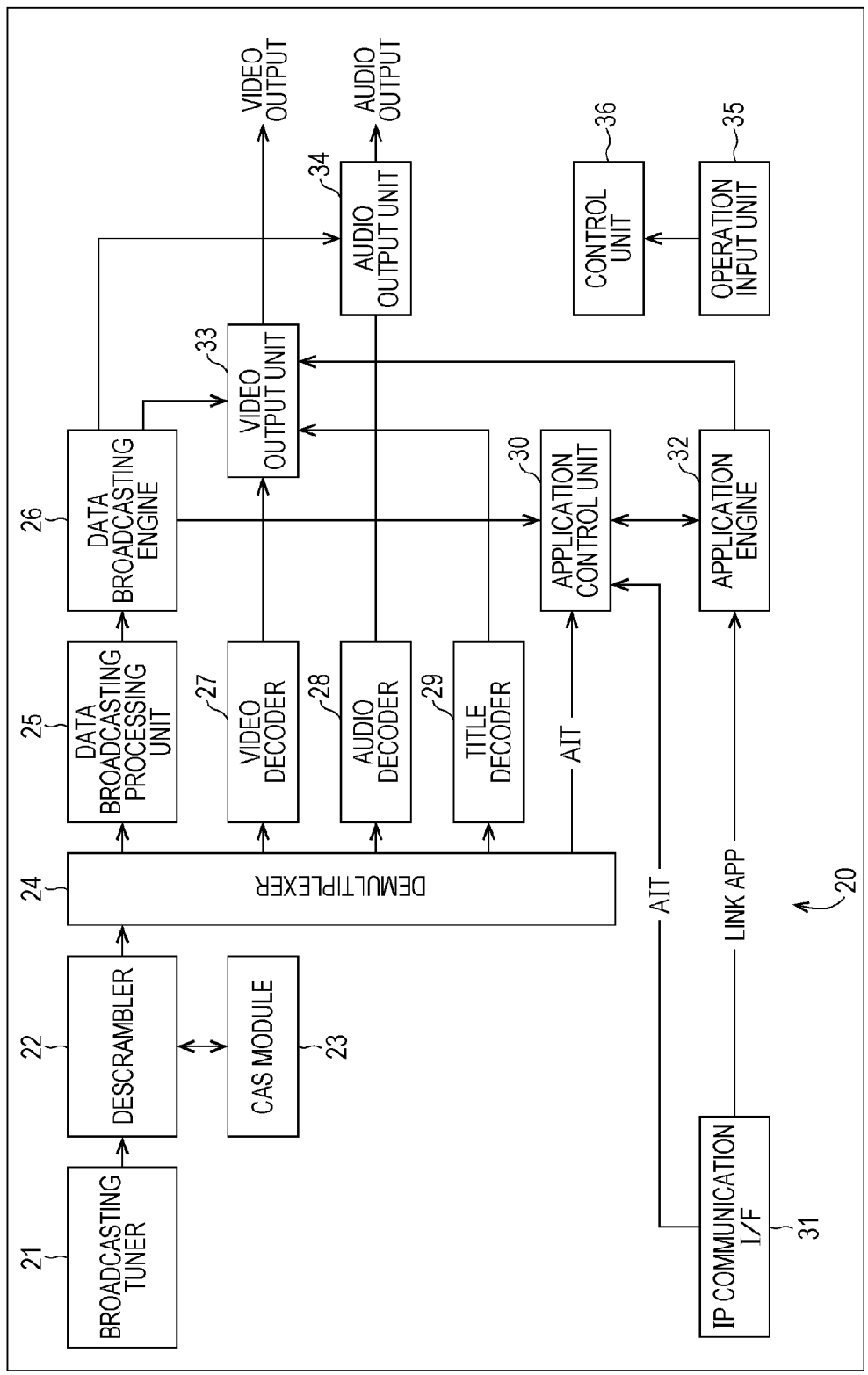
FIG. 2 is a block diagram illustrating a configuration example of a receiving device illustrated in FIG. 1.

FIG. 2 illustrates a configuration example of the receiving device 20.

The receiving device 20 includes a broadcasting tuner 21, a descrambler 22, a CAS module 23, a demultiplexer 24, a data broadcasting processing unit 25, a data broadcasting engine 26, a video decoder 27, an audio decoder 28, and a title decoder 29 as a television broadcasting receiving system. The receiving device 20 further includes an application control unit 30, an IP communication I/F 31, and an application engine 32 as a link app control system. The receiving device 20 further includes a video output unit 33, an audio output unit 34, an operation input unit 35, and a control unit 36 as an input/output system.

The broadcasting tuner 21 receives and demodulates frequency components corresponding to channel selection from broadcasted television signals, and outputs acquired broadcasting streams to the descrambler 22. The descrambler 22 cancels scrambling by using a key obtained from the CAS (Conditional Access System) module 23 when the broadcasting streams are scrambled, and outputs the resultant broadcasting streams to the demultiplexer 234. The CAS module 23 obtains a key for canceling scramble from a B-CAS card or the like.

The demultiplexer 24 separates and extracts data broadcasting signals from the broadcasting streams, and outputs the extracted data broadcasting signals to the data broadcasting processing unit 25. In addition, the demultiplexer 24 separates and extracts encoded video data, encoded audio data, and encoded title data of a program from the broadcasting streams, and outputs the extracted respective data to the video decoder 27, the audio decoder 28, and the title decoder 29. Furthermore, the demultiplexer 24 separates and extracts application control information (referred to as AIT (Application Information Table) as well) from the broadcasting streams, and outputs the extracted information to the application control unit 30.

The data broadcasting processing unit 25 reads a data broadcasting app described in BML (Broadcast Markup Language) or JAVA (registered trademark), for example, from the data broadcasting signals, and outputs the app to the data broadcasting engine 26. The data broadcasting engine 26 executes the data broadcasting app described in BML or the like by using a built-in BML browser, for example. The executed data broadcasting app outputs data broadcasting video signals to the video output unit 33, and outputs data broadcasting audio signals to the audio output unit 34. The executed data broadcasting app controls the application control unit 30 to start a link app.

The video decoder 27 decodes encoded video data, and outputs video signals of the program obtained by decoding to the video output unit 33. The audio decoder 28 decodes encoded audio data, and outputs audio signals of the program obtained by decoding to the audio output unit 34. The title decoder 29 decodes encoded title data, and outputs title signals of the program obtained by decoding to the video output unit 33.

The application control unit 30 analyzes application control information (AIT) input from the demultiplexer 24, and controls the application engine 32 based on the analysis result. In addition, the application control unit 30 acquires application control information (AIT) from a predetermined server (such as the communicating device 13) via the IP communication network 14 by controlling the IP communication I/F 31, and controls the application engine 32 based on the analysis result obtained by analysis of the acquired application control information. The IP communication I/F 31 communicates with the predetermined server (such as the communicating device 13) via the IP communication network 14.

The application engine 32 accesses the communicating device 13 via the IP communication I/F 31 and the IP communication network 14 under the control of the application control unit 30, and acquires and executes a link app described in HTML5 or the like. Then, the application engine 32 outputs video signals received from the link app to the video output unit 33, and audio signals received from the link app to the audio output unit 34. The application engine 32 also executes ordinary applications (such as Internet browsers) different from link apps, for example.

The video output unit 33 selects or combines video signals input from the respective units, and outputs the resultant video signals to the downstream units. The audio output unit 34 selects or combines audio signals input from the respective units, and outputs the resultant audio signals to the downstream units.

The operation input unit 35 receives various types of operation inputs from a user, and outputs operation signals of the operation inputs to the control unit 36. The control unit 36 controls the respective units of the receiving device 20 based on the operation signals.

[Description of Operation Outlines]

Described herein are operation outlines of two types of link apps (broadcasting start type link app and non-broadcasting start type link app) according to the link application control system 10.

Figure 3:
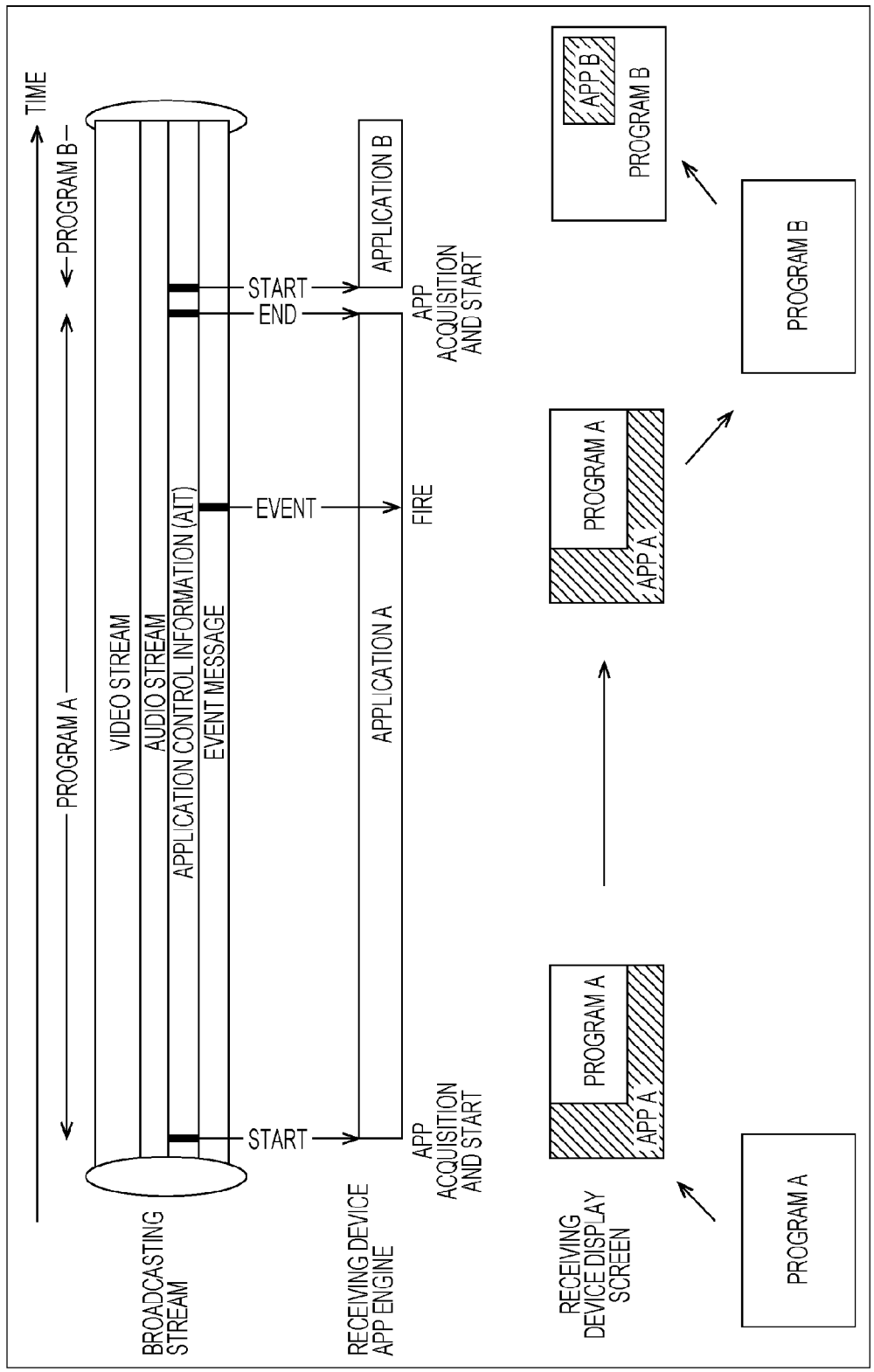
FIG. 3 is a figure illustrating an outline of operation of a broadcasting start type link application.

FIG. 3 illustrates the operation outline of the broadcasting start type link app. The broadcasting start type link app is a link app acquired and started by the receiving device 20 based on application control information (AIT) contained in broadcasting streams. The application control information may be broadcasted as streams different from video streams and audio streams as illustrated in the figure, or may be broadcasted while embedded in video streams or audio streams.

When receiving application control information broadcasted together with a program A as illustrated in the figure, for example, the receiving device 20 acquires a link app A from the communicating device 13 and starts the link app A based on the application control information. When application control information contains an item as a trigger for starting a link app, the same application control information is successively broadcasted a plurality of times so as to avoid failure of reception of the information on the receiving side.

The started link app A forms a display area for the program A in an image of the link app A to display the program A on a sub-screen, for example. In addition, the image of the link app A is changeable, for example, in response to firing of an event based on an event message. The link app A ends in accordance with the end of the program A (or the link app A may be kept activated without ending).

When a program B is started after the program A, a link app B is acquired and started similarly to the case of the program A. The link app B may be started simultaneously with the end of the link app A. The started link app B forms a sub-screen for the link app B within an image of the program B displayed on a full-screen to display the link app B on the sub-screen, for example. The link app B ends in accordance with the end of the program B (or the link app B may be kept activated without ending).

Figure 4:
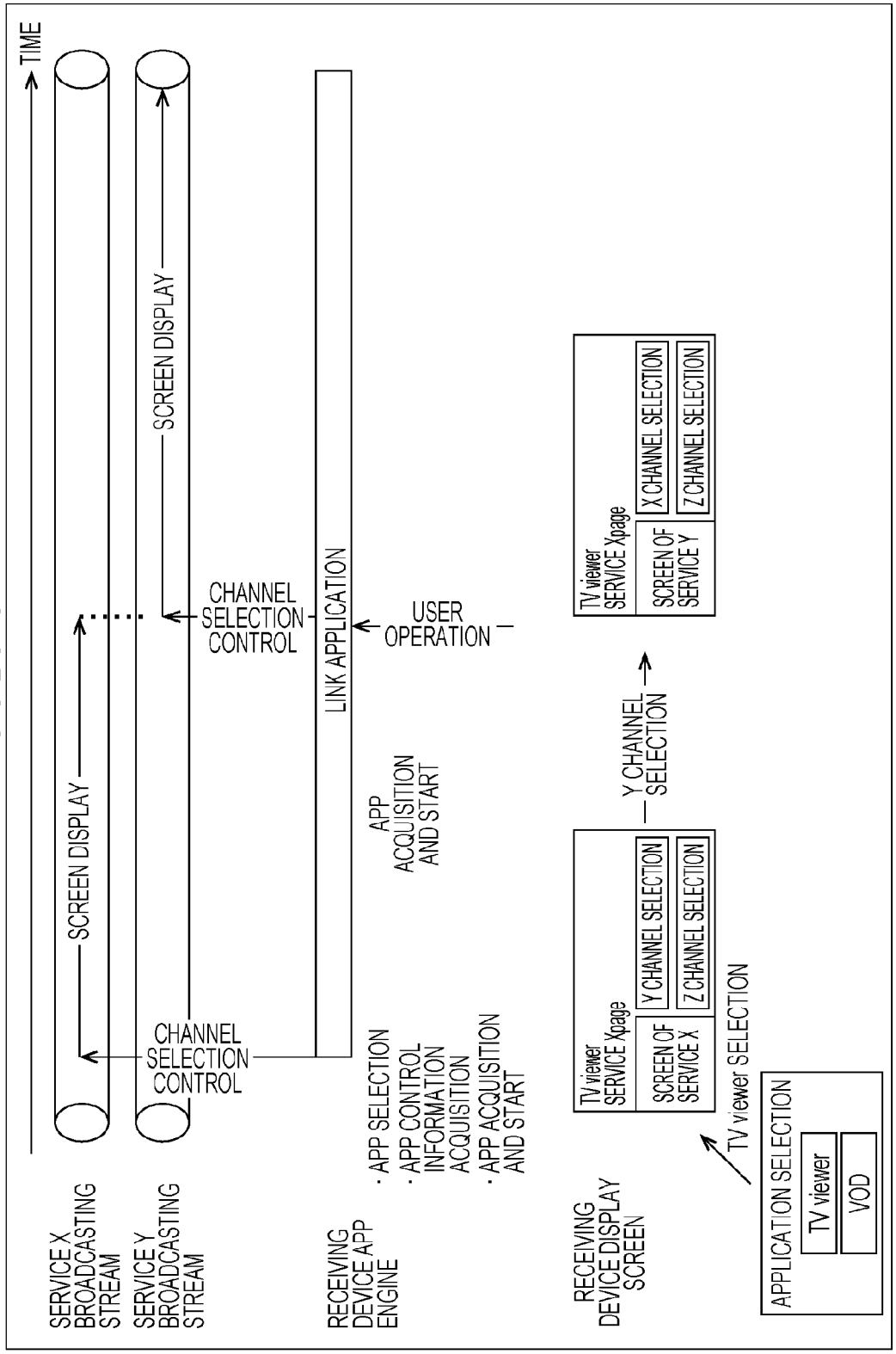
FIG. 4 is a figure illustrating an outline of operation of a non-broadcasting start type link application.

FIG. 4 referred to next illustrates the operation outline of a non-broadcasting start type link app. The non-broadcasting start type link app is a link app started by the receiving device 20 in response to operation input from the user.

For example, the receiving device 20 is configured to display an application launcher (Application launcher) through which the user selects an execution target from plural apps allowed to be executed. The application launcher according to the example illustrated in the figure allows selection of a link app "TV viewer" for viewing television programs, and an app "VOD" (video on demand) for viewing contents distributed via the IP communication network 14. When the user selects "TV viewer" through the application launcher, the receiving device 20 accesses a predetermined URL (representing the communicating device 13 in this example) associated with the "TV viewer" beforehand, and acquires application control information corresponding to the link app "TV viewer".

The receiving device 20 having received the application control information acquires the link app "TV viewer" from the communicating device 13 and starts the link app only when reliability of the link app is confirmed based on analysis of the information (for example, when electronic signature given thereto is verified). The link app "TV viewer" may be retained in the receiving device 20 beforehand.

The started link app "TV viewer" controls the television broadcasting receiving system of the receiving device 20 to allow control of channel selection of services (channels) to be received. In addition, the link app "TV viewer" displays channel selection buttons corresponding to a user interface within an image of the link app "TV viewer". For example, when channel selection is made in the order of a service (channel) X, and then a service (channel) Y in accordance with operation by the user, the link app "TV viewer" initially displays a program broadcasted in the service X, and subsequently displays a program broadcasted in the service Y in a program display area on the output screen of the link app "TV viewer".

[State Switching of Receiving Device 20]

Figure 5:
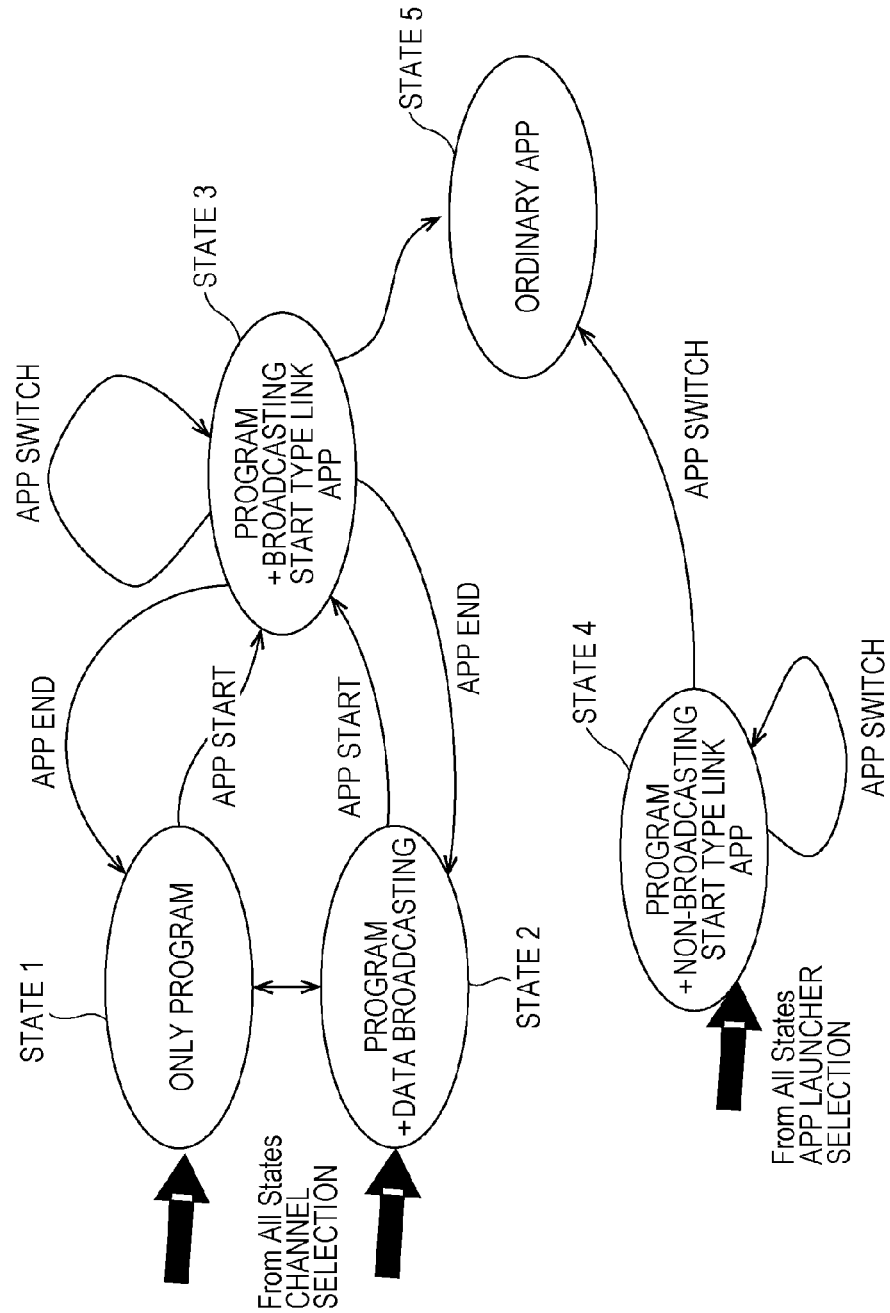
FIG. 5 is a figure illustrating state switching of display of the receiving device.

FIG. 5 illustrates state switching of display of the receiving device 20.

There are defined five types of states as display states of the receiving device 20.

A state 1 is a state of reception and display of a broadcasted program. A state 2 is a state of reception of the broadcasted program and data broadcasting, and simultaneous display of the program and the data broadcasting. A state 3 is a state of combined display of the broadcasted program and an image of a broadcasting start type link app. A state 4 is a state of combined display of the broadcasted program and an image of a non-broadcasting type link app. A state 5 is a state of display of an image of an ordinary app different from the broadcasting start type link app and the non-broadcasting start type link app.

All states are switchable to the state 1 based on channel selection operation for television broadcasting. The state 1 switches to the state 2 when data broadcasting is additionally received in the state 1. The state 1 switches to the state 3 when the broadcasting start type link app is started in the state 1.

All states are switchable to the state 2 based on channel selection operation for television broadcasting. The state 2 switches to the state 1 when the data broadcasting is stopped in the state 2. The state 2 switches to the state 3 when the broadcasting start type link app is started.

In the state 3, switching of the broadcasting start type link app is allowed (that is, the broadcasting start type link app may be switched to another broadcasting start type link app). The state 3 switches to the state 1 or the state 2 when the broadcasting start type link app in execution in the state 3 is ended. The state 3 switches to the state 5 when the user selects a hyper link such as an ad banner, for example.

All states are switchable to the state 4 based on selection of a non-broadcasting start type link app through an application launcher. In the state 4, switching of the non-broadcasting start type link app is allowed (that is, the non-broadcasting start type link app may be switched to another non-broadcasting start type link app). The state 4 switches to the state 5 when the user selects a hyper link such as an ad banner in the state 4, for example.

The state 5 is not allowed to switch to any of the states 1 through 4. An ordinary app in execution needs to be ended when the state is to return from the state 5 to any of the states 1 through 4.

[Application Control Information (AIT) Corresponding to First Embodiment]

FIG. 6 referred to next illustrates respective items contained in application control information corresponding to the first embodiment. As discussed above, the receiving device control functions are controlled on the broadcasting side for each of link applications according to the first embodiment.

Application control information 50 contains an application type 51, an enterprise ID 52, an application ID 53, an application control command 54, and an application specification version 55 as required items.

The application control information 50 may further contain a receiving device requiring function profile 56, an application URL 57, an application boundary 58, an application system priority 59, an application broadcasting link range 60, permission information 61, and a server access dispersion parameter 62 as optional items. Some of the optional items herein may become required items depending on the types of control options shown in the application control command 54.

The application type 51 is information indicating a type (description language) of a corresponding link app. The enterprise ID 52 is identification information on an application enterprise who has created the corresponding link app. The application ID 53 is unique identification information on the corresponding link app for a particular enterprise.

The application control command 54 is information on a control action for the corresponding link app, indicating any one of four types of actions of automatic start, prefetch, end, and action permission. The automatic start refers to acquisition and start of the corresponding link app when the app is not yet acquired. The prefetch refers to acquisition of the corresponding link app beforehand prior to the auto. The end refers to ending of the corresponding link app. The action permission refers to an execution permitted state of the corresponding link app at the time of acquisition of the corresponding application control information 50.

The application specification version 55 is information indicating a version number for each application type (description language)

The receiving device requiring function profile 56 is a profile value representing a function required for the receiving device 20 at the time of execution of the corresponding link app (such as built-in decoder corresponding to a predetermined encoding system, and built-in storage having at least a predetermined capacity). The receiving device 20 is allowed to start the corresponding link app only when the receiving device 20 has a function indicated by the profile value.

The application URL 57 is a URL (Uniform Resource Locator) representing a target (the communicating device 13 in this embodiment) from which the corresponding link app is acquired. The application boundary 58 is information indicating the range of web pages to which the corresponding link app is switchable. The application system priority 59 is information indicating the degree of priority over plural applications (including data broadcasting) configured to automatically start by settings. The application broadcasting link range 60 is information indicating a range (link action range) of continuous execution of the link app in execution without end.

The permission information 61 is information for controlling the receiving device control functions for the corresponding link app. The receiving device control functions in this context include determination of the layout of screen output from the receiving device 20, reference to metadata of a program, and actions associated with reception by the receiving device 20 (such as channel selection). The permission information 61 will be detailed with reference to FIG. 7 and FIG. 8.

The server access dispersion parameter 62 is a control parameter for dispersing accesses to the server as the target (the communicating device 13 in this embodiment) from which the corresponding link app is acquired on the time-basis.

[Bit Map of Permission Information 61]

Figure 7:
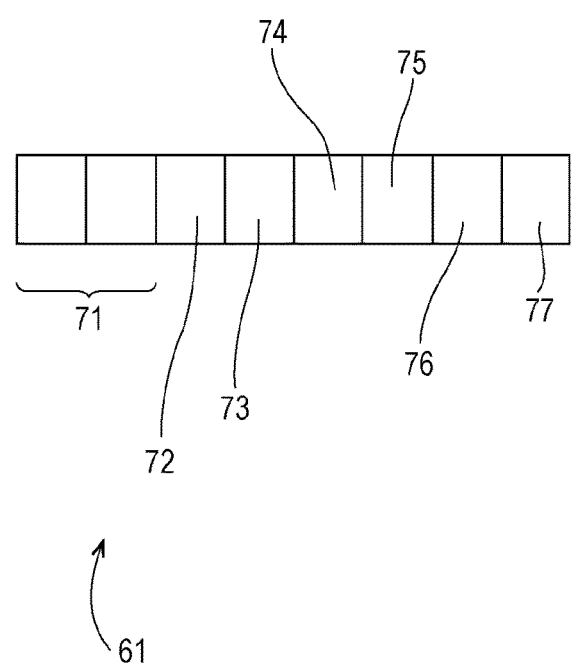
FIG. 7 is a figure illustrating a bit map of permission information.

FIG. 7 is an example of a bit map of the permission information 61. While the permission information 61 is constituted by 8 bits in the example shown in the figure, a larger number of bits may be allotted to the permission information 61.

The permission information 61 includes 2 bits of image reference 71, and 1 bit for each of real time channel selection 72, timer channel selection 73, SI reference 74, current channel selection information acquisition 75, NVRAM Read 76, and NVRAM Write 77 in this order from the highest side.

The 2-bit image reference 71 relates to the layout of images of the program on the screen, indicating a level permitted for the link app. FIG. 8 illustrates the image reference 71 of the permission information 61.

As illustrated in FIG. 8, the 2-bit image reference 71 is set to 00, 01, 10, or 11.

The image reference 71 is not set to 00 (this setting is not permitted) for a broadcasting start type link app. On the other hand, the image reference 71 is permitted to be set to 00 for a non-broadcasting start type link app. When the image reference 71 is set to 00, it is intended that the non-broadcasting type link app is not permitted to refer to (quote) information acquired from broadcasting streams.

When the image reference 71 is set to 01 for a broadcasting start type link app, it is intended that a permitted state is to display an image of a program throughout the screen without display of an image of the link app.

When the image reference 71 is set to 01 for a non-broadcasting start type link app, it is intended that a permitted state is to display an image of a program throughout the screen without display of an image of link app, or not to refer to information acquired from broadcasting.

When the image reference 71 is set to 10 for a broadcasting start type link app, it is intended that a permitted state is to display an image of a program on a sub-screen in an image of the link app.

When the image reference 71 is set to 10 for a non-broadcasting start type link app, it is intended that a permitted state is to display an image of a program on a sub-screen in an image of the link app, or not to refer to information acquired from broadcasting.

When the image reference 71 is set to 11 for a broadcasting start type link app, it is intended that permitted states are to display an image of a program on a sub-screen in an image of the link app, and to overlay an image of the link app on an image of a program.

When the image reference 71 is set to 10 for a non-broadcasting start type link app, it is intended that permitted states are to display an image of a program on a sub-screen in an image of the link app, to overlay an image of the link app on an image of a program, and not to refer to information acquired from broadcasting.

Return to FIG. 7. The 1-bit real time channel selection 72 indicates whether or not real time channel selection (channel change) is permitted for the link app. The 1-bit timer channel selection 73 indicates whether or not timer channel selection (including timer recording) is permitted for the link app.

The 1-bit SI reference 74 indicates whether or not reference to SI (Service Information) contained in the broadcasting streams is permitted for the link app. The 1-bit current channel selection information acquisition 75 indicates whether or not acquisition of information (Network ID or the like) indicating a service (channel) currently selected by the receiving device 20 is permitted.

The 1-bit NVRAM Read 76 indicates whether or not reading of information from a non-volatile memory contained in the receiving device 20 is permitted. The 1-bit NVRAM Write 77 indicates whether or not writing of information to the non-volatile memory contained in the receiving device 20 is permitted.

[Description of Link Application Execution Process Corresponding to First Embodiment]

Figure 9:
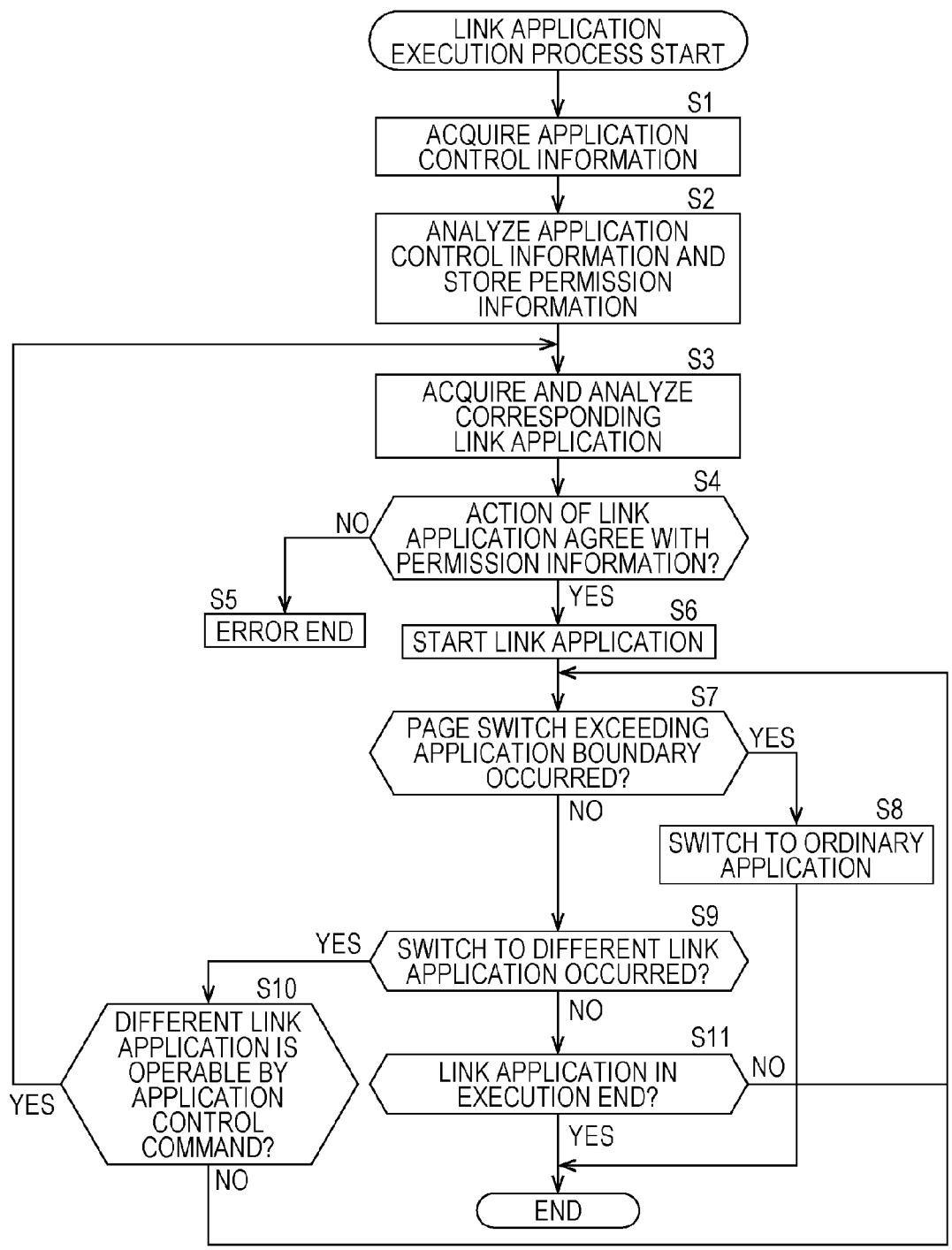
FIG. 9 is a flowchart describing a link application execution process corresponding to the first embodiment.

FIG. 9 referred to next is a flowchart describing a link application execution process executed by the receiving device 20 according to the first embodiment.

This link application execution process is started as preprocessing executed at the time of start of a broadcasting start type link app in response to automatic start of a control action indicated by the application control command 54 of the application control information 50 received by the receiving device 20 together with a program. It is assumed herein that the receiving device 20 constantly receives the latest application control information 50 from broadcasting streams during reception of the program.

In step S1, the application control unit 30 acquires the latest application control information 50 from the demultiplexer 24. In step S2, the application control unit 30 analyzes the application control information 50, and stores the permission information 61 contained in the application control information 50.

In step S3, the application control unit 30 allows the IP communication I/F 31 to acquire a corresponding broadcasting start type link app from the communicating device 13 based on the application URL 57 of the application control information 50. The acquired broadcasting start type link app is supplied to the application engine 32. When the corresponding broadcasting start type link app is already acquired, step S3 may be omitted.

In step S4, the application control unit 30 analyzes description contents (data contents of application program) of the broadcasting start type link app supplied to the application engine 32, and determines whether or not an action corresponding to a receiving device control function executed by the broadcasting start type link app agrees with the contents permitted in the permission information 61 of the application control information 50. When the determination result is negative, the corresponding broadcasting start type link app is regarded as an application which has intention of controlling the receiving device 20 at a level not permitted by the permission information 61. In this case, it is probable that the application has been intentionally created by an app enterprise with ill intention, or produced with programming errors. Accordingly, the process proceeds to step S5, and ends the link application execution process as an error without starting the broadcasting start type link app.

When the determination result is positive in step S4, the processing proceeds to step S6. In step S6, the application engine 32 starts the corresponding broadcasting start type link app under the control of the application control unit 30. As a result, the receiving device 20 comes into the state 3 in FIG. 5.

After the start of the corresponding broadcasting start type link app, the process proceeds to step S7. In step S7, the application control unit 30 determines whether or not switching of a web page in excess of the action range indicated by the application boundary 58 of the application control information 50 has occurred under the broadcasting start type link app executed by the application engine 32. When the determination result is positive in this step, the process proceeds to step S8. In step S8, the application engine 32 ends the broadcasting start type link app in execution, and starts an Internet browser or the like as an ordinary app. The Internet browser or the like displays a page of the switching destination. As a result, the link application execution process ends, whereby the receiving device 20 comes into the state 5 in FIG. 5.

When the determination result is negative in step S7, the process proceeds to step S9. In step S9, the application control unit 30 determines whether or not switching to a different broadcasting start type link app has occurred under the broadcasting start type link app in execution. When the determination result is positive in this step, the process proceeds to step S10. In step S10, the application control unit 30 refers to the application control command 54 of the latest received application control information 50 to determine whether or not the different broadcasting start type link app of the switching destination is currently operable. When the determination result is positive in this step, the process returns to step S3. Then, the processes after step S3 discussed above are executed to start the different broadcasting type link app of the switching destination. On the other hand, when the determination result is negative in step S10, the different broadcasting start type link app of the switching destination is not started. In this case, the process returns to step S7, and the processes after step S7 are repeated.

When the determination result is negative in step S9, the process proceeds to step S11. In step S11, the application control unit 30 determines whether or not the broadcasting start type link app in execution by the application engine 32 is to be ended. More specifically, it is determined that the corresponding app is to be ended when the application control command 54 of the latest received application control information 50 is an end command, or when a predetermined end operation is received from the user. When the determination result is negative in this step, the process returns to step S7, and the processes after step S7 are repeated. On the other hand, when the determination result is positive in step S11, the broadcasting start type link app in execution by the application engine 32 is ended, whereby the link application execution process is similarly ended.

According to the link application execution process discussed herein, start of a broadcasting start type link app and execution of receiving device control functions of the broadcasting start type link app are controllable on the broadcasting side step by step based on the permission information 61 of the application control information 50.

The foregoing link application execution process is similarly executed as preprocessing at the time of start of a non-broadcasting start type link application on the receiving device 20 side. In this case, however, the source of supply of the application control information 50 is switched to a predetermined server. Accordingly, when such a configuration is adopted which limits the application control information 50 to be supplied to the receiving device 20 only to the proper application control information 50 authenticated by the broadcasting side, receiving device control functions of a non-broadcasting start type link app become controllable step by step on the broadcasting side.

2. Second Embodiment

A second embodiment is hereinafter described. According to the first embodiment, permission information is set for respective link apps. However, in the second embodiment, such a configuration is adopted which controls receiving device control functions on the broadcasting side for each domain of web pages to which link apps are switchable (each domain of servers from which data is acquired for reference).

Figure 10:
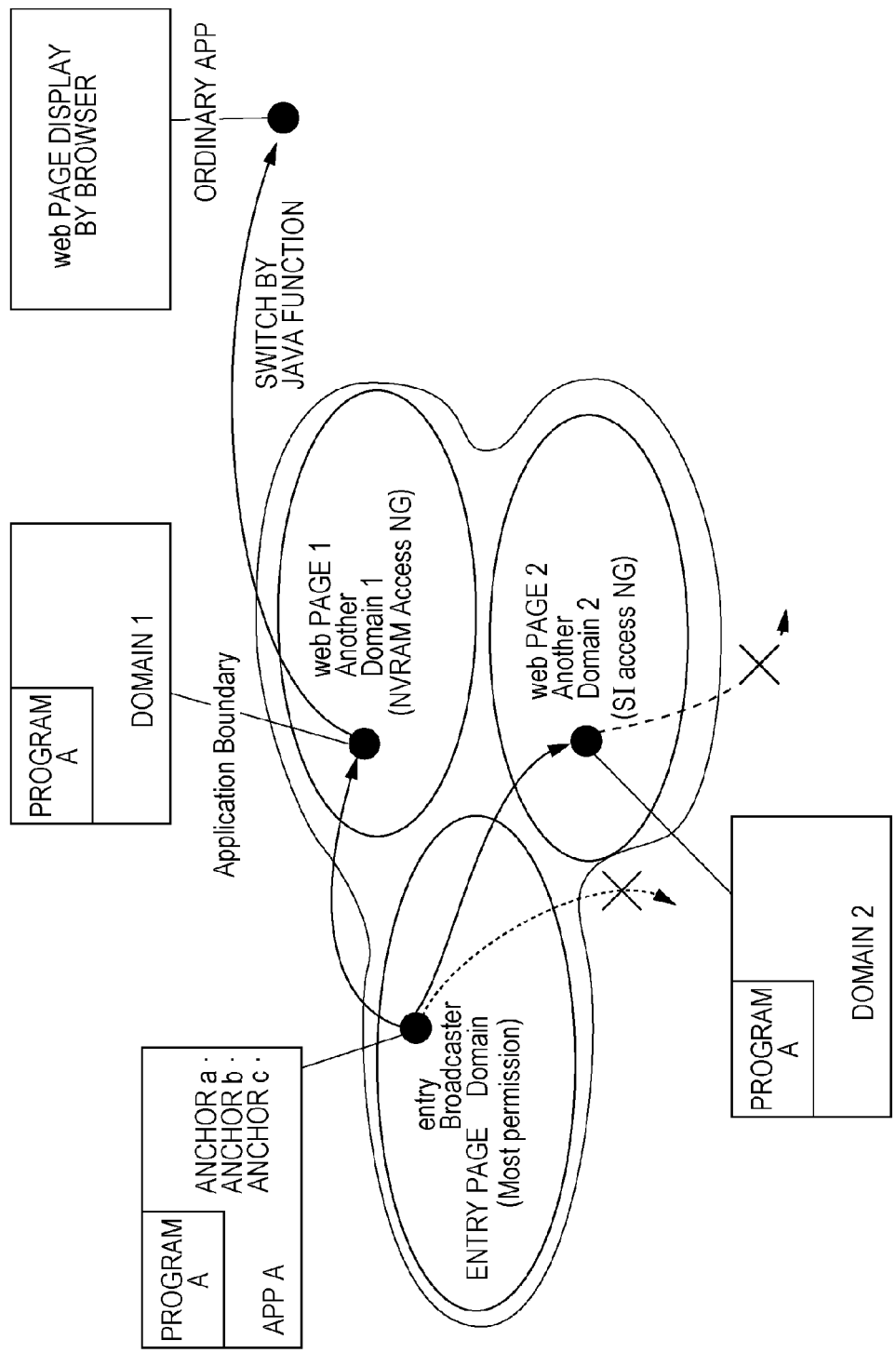
FIG. 10 is a figure illustrating an example in which receiving device control functions are controlled on the broadcasting side for each domain of web pages as switching destinations.

FIG. 10 illustrates an example in which receiving device control functions are controlled on the broadcasting side for each domain of web pages to which a link application is switchable, in other words, permission information is set for each domain of web pages.

According to the example in FIG. 10, for example, all items of permission information are set as permitted for a domain of an entry page (entry Broadcaster Domain) of a link app A corresponding to a program A. Data reading and writing from and to NVRAM are prohibited for a domain of a web page 1 (Another Domain 1) linked with an anchor a of the entry page. The SI reference is prohibited for a domain of a web page 2 (Another Domain 2) linked with an anchor b of the entry page. Switching is not permitted for a domain of a web page linked with an anchor c of the entry page.

Under these settings, the link app A executed with link between the link app A and the program A is allowed to be switched to the web page 1 or the web page 2 from the entry page in accordance with operation by the user. However, the link app A in the state switched to the web page 1 is not allowed to access the NVRAM of the receiving device 20. In addition, the link app A in the state switched to the web page 2 is not allowed to refer to the SI of broadcasting streams received by the receiving device 20. The link app A in execution is not switchable to web pages other than the web page 1 or the web page 2, but is switchable to web pages of ordinary apps when a dedicated JAVA (registered trademark) script function is used.

Figure 11:
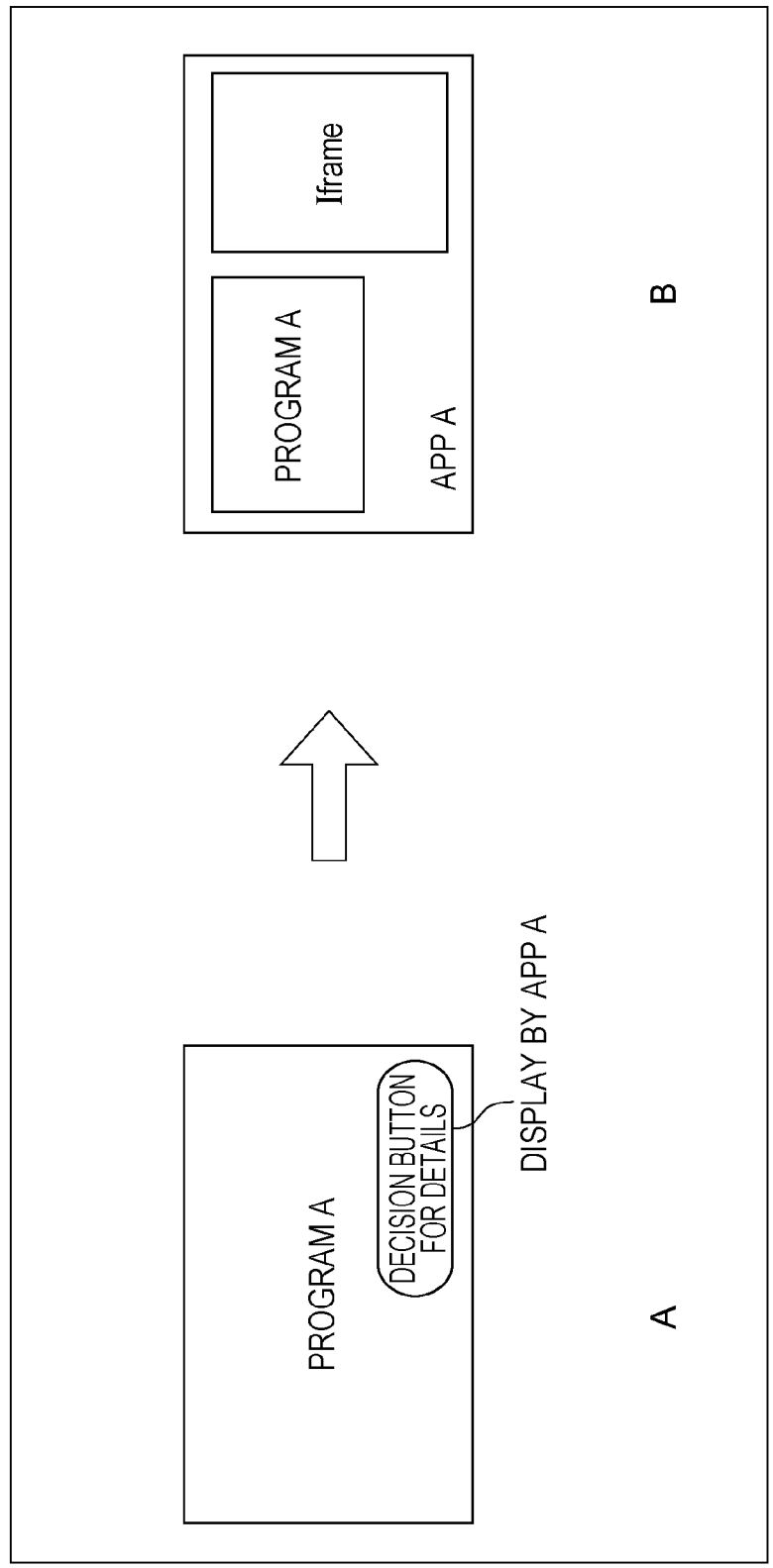
FIG. 11 is a figure illustrating an inline frame.

When the user performs operation associated with an anchor saying "decision button for details" in response to display of the anchor, for example, on the screen of the program A as the entry page of the link app A executed with link between the link app A and the program A, display of the program A on a sub-screen, and display of a web page in a display area of the link app A as an inline frame (Iframe) appear in response to the operation by the user according to a possible example of operation illustrated in FIG. 11.

In an inline frame, switching of web pages may be executed in a nested manner, wherefore it is practically impossible to set permission information for all domains of web pages as switching destinations within an inline frame. According to the second embodiment, therefore, permission information is individually set for domains designated as application domains, while common permission information is collectively set for domains out of the range of application domains (i.e., receiving device control functions are controlled on the broadcasting side during switching to the corresponding domains).

Figure 12:
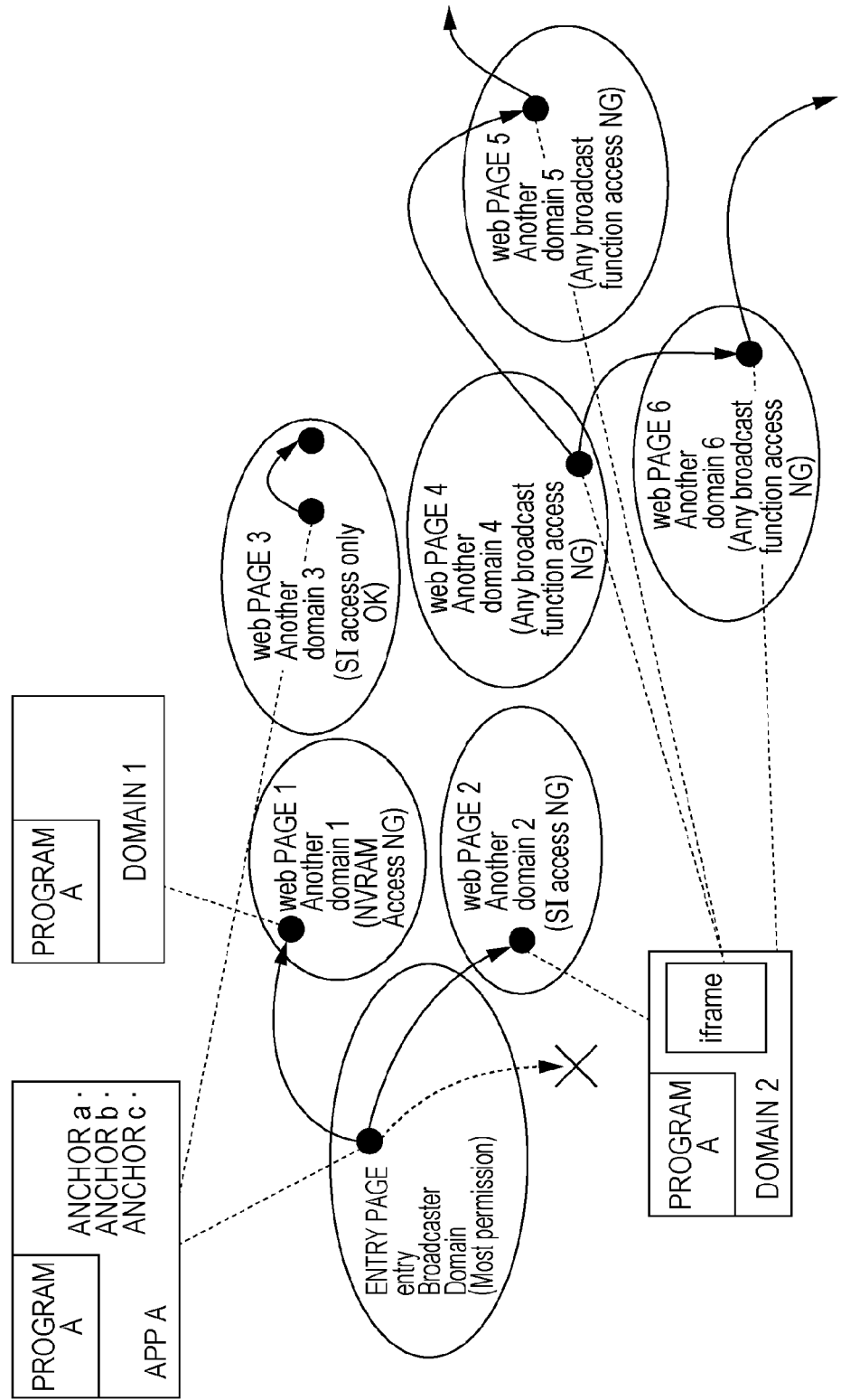
FIG. 12 is a figure illustrating an example in which receiving device control functions executed on web pages as switching destinations are collectively controlled within an inline frame on the broadcasting side.

FIG. 12 illustrates an example which sets common permission information collectively for domains out of the range designated by a link application.

In case of the example illustrated in FIG. 12, all items of permission information are permitted for the domain of the entry page (entry Broadcaster Domain) of the link app A corresponding to the program A. Data reading and writing from and to NVRAM are prohibited for a domain of the web page 1 (Another Domain 1) linked with the anchor a of the entry page. The SI reference is prohibited for a domain of a web page 3 (Another Domain 3) linked with the web page 1. The SI reference is prohibited for a domain of a web page 2 (Another Domain 2) linked with an anchor b of the entry page. Switching is not permitted for a domain of a web page linked with an anchor c of the entry page.

All items of permission information are collectively prohibited for domains out of the range.

Under these settings, the link app A executed with link between the link app A and the program A is allowed to be switched to the web page 1 or the web page 2 from the entry page in accordance with operation by the user. In addition, switching from the web page 1 to the web page 3 is allowed. However, the link app A in the state switched to the web page 1 is not allowed to access the NVRAM of the receiving device 20. In addition, the link app A in the state switched to the web page 2 or the web page 3 is not allowed to refer to the SI of broadcasting streams received by the receiving device 20. The web page 2 uses an inline frame. In the inline frame, the web page 2 is switchable to Another Domains 4, 5, and 6 and displays corresponding web pages. However, all items of permission information are set as prohibited for Another Domains 4, 5, and 6, wherefore display of the sub-screen of the program A requiring an image reference of the program A is not executable, for example. Needless to say, when image reference of permission information is permitted for Another Domains 4, 5, and 6 as common permission, display of the sub-screen of the program A is executable.

[Application Control Information (AIT) Corresponding to Second Embodiment]

FIG. 13 referred to next illustrates respective items contained in application control information 100 according to the second embodiment. Items in the application control information 100 similar to the corresponding items in the application control information 50 in the first embodiment are given similar reference numbers, and the same explanation of these items is not repeated.

As apparent from FIG. 13, the application control information 100 is information which eliminates the application boundary 58 and the permission information 61 from the application control information 50, and adds application boundary and domain unit permission information 101 to the application control information 50.

The application boundary and domain unit permission information 101 designates a domain range of web pages to which a link app is switchable, sets permission information for each domain contained in the range, and sets common permission information collectively for domains out of the range.

While the permission information 61 of the application control information 50 is constituted by 8 bits, the permission information of the application boundary and domain unit permission information 101 is extended to 16 bits.

FIG. 14 referred to next illustrates an example of a syntax corresponding to the application control information 100 illustrated in FIG. 13.

The application type 51 included in the items of the application control information 100 is described in underlined application_type in the syntax. The enterprise ID 52 and the application ID 53 are described in underlined application_identifier( ). The application control command 54 is described in underlined application_control_code. The application specification version 55 is described in underlined version_number. Other items of the application control information 100 are described in underlined descriptor( ).

FIG. 15 illustrates an example of a syntax of the application boundary and domain unit permission information 101 described in the foregoing descriptor( ).

Boundaryless_flag underlined in the syntax is a flag showing whether or not the application boundary is set infinite, more specifically, 1-bit information indicating whether or not switching to web pages of domains out of the range of domains designated in the descriptor( ) is allowed. When boundaryless_flag=1, switching to arbitrary domains is allowed. When boundarylss_flag=0, the range of domains designated in the descriptor( ) corresponds to application domains, wherefore switching to an area out of the range of the application boundary is not permitted. When boundaryless_flag=1, common permission information (all items prohibited) is collectively set for domains out of the domain range designated in the descriptor( ).

Rather than the setting for prohibiting all the items contained in the common permission information collectively set, such a setting is allowed which only permits a predetermined item of the common information. In this case, specific permission information (similar to permission_bitmap described later) collectively set for domains out of the range is described subsequently to the boundaryless_flag.

The number of domains set as domains belonging to the application boundary is described in boundary_extension_count. Character strings (arbitrary URL) representing domains (or sub-directions thereof) belonging to the application boundary are described in boundary_extension_byte.

Permission information set for domains belonging to the application boundary is contained in the permission_bitmap. The permission_bitmap represents all items of the 8-bit permission information 61 illustrated in FIG. 7, and extended to 16 bits so that items can be further added thereto.

The higher 3 bits of the 16 bits indicate switching of the permission_bitmap. For example, 000 is described in the higher 3 bits of the permission_bitmap corresponding to the first domain belonging to the application boundary, while 001 is described in the higher 3 bits of the permission_bitmap corresponding to the second domain.

[Description of Link Application Execution Process Corresponding to Second Embodiment]

Figure 16:
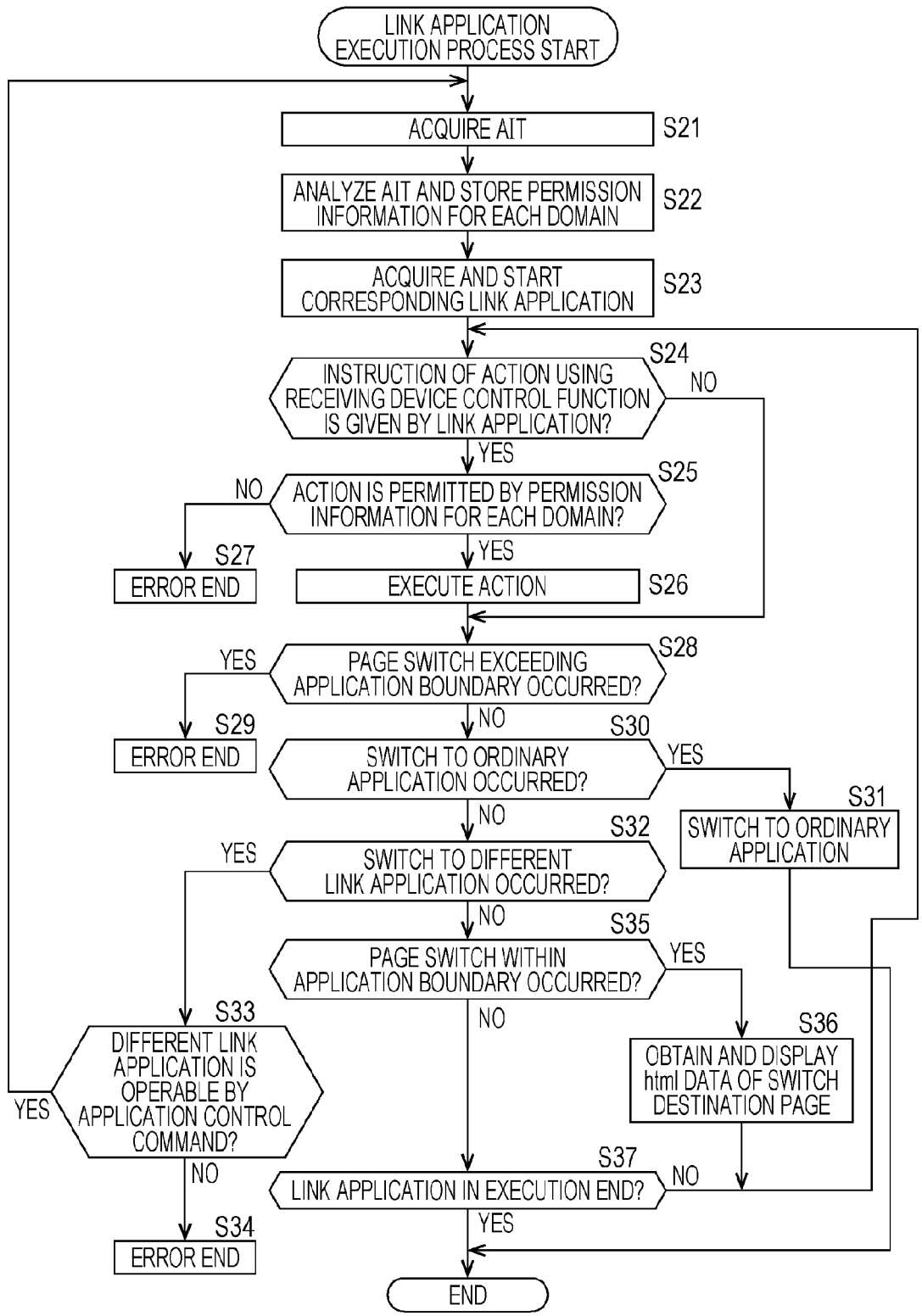
FIG. 16 is a flowchart describing a link application execution process corresponding to the second embodiment.

FIG. 16 referred to next is a flowchart describing a link application execution process executed by the receiving device 20 according to the second embodiment.

This link application execution process is started as preprocessing executed at the time of start of a broadcasting start type link app in response to automatic start of a control action indicated by the application control command 54 of the application control information 100 received by the receiving device 20 together with a program. It is assumed herein that the receiving device 20 constantly receives the latest application control information 100 from broadcasting streams during reception of a program.

In step S21, the application control unit 30 acquires the latest application control information 100 from the demultiplexer 24. In step S22, the application control unit 30 analyzes the application control information 100, and stores the application boundary and domain unit permission information 101 (hereinafter abbreviated as domain unit permission information 101) contained in the application control information 100.

In step S23, the application control unit 30 allows the IP communication I/F 31 to acquire a corresponding broadcasting start type link app from the communicating device 13 based on the application URL 57 of the application control information 100, and allows the application engine 32 to start the acquired broadcasting start type link app. When the corresponding broadcasting start type link app is already acquired, the acquisition step may be omitted.

In step S24, the application control unit 30 determines whether or not the broadcasting start type link app started by the application engine 32 has given an instruction for executing an action utilizing a receiving device control function (more specifically, an action corresponding to respective items of the domain unit permission information 101). When the determination result is positive in this step, the process proceeds to step S25.

In step S25, it is determined whether or not the corresponding action is permitted by the domain unit permission information 101 set for the domain as the current switching destination. When the determination result is positive in this step, the process proceeds to step S26. In step S26, the action utilizing the receiving device control function indicated in the instruction given from the broadcasting start type link app is executed.

When the determination result is negative in step S25, the process proceeds to step S27, where the application control unit 30 allows the application engine 32 to end the broadcasting start type link app which has given the instruction of the prohibited action. Then, the corresponding link application execution process is ended as an error. In this case, the action of the instruction may be ignored instead of ending of the broadcasting start type link app.

When the determination result is negative in step S24, the processes in steps S25 through S27 are skipped. Then, the process proceeds to step S28.

In step S28, the application control unit 30 determines whether or not switching to a web page exceeding the range of the application boundary set by the application boundary and domain unit permission information 101 of the application control information 100 has occurred under the broadcasting start type link app in execution. When the determination result is positive in this step, the process proceeds to step S29. When boundaryless_flag=1, it is assumed that switching in excess of the application boundary does not occur in such a state that the permission information shows all prohibited for domains other than domains designated by the application control information 100.

In step S29, the application engine 32 ends the broadcasting start type link app having intension to switch to a web page out of the range of the application boundary under control of the application control unit 30. Then, the corresponding link application execution process is ended as an error. In this case, the switching action of the instruction may be ignored instead of ending of the broadcasting start type link app.

When the determination result is positive in step S28, the process proceeds to step S30. In step S30, the application control unit 30 determines whether or not switching to an ordinary app such as an Internet browser has occurred by the use of a predetermined JAVA (registered trademark) script function, for example, under the broadcasting start type link app in execution. When the determination result is positive in this step, the process proceeds to step S31. In step S31, the application engine 32 ends the broadcasting start type link app in execution under the control of the application control unit 30, and starts an Internet browser or the like as an ordinary app. As a result, the link application execution process ends.

When the determination result is negative in step S30, the process proceeds to step S32. In step S32, the application control unit 30 determines whether or not switching from the broadcasting start type link app in execution to another broadcasting start type link app has occurred. When the determination result is positive in this step, the process proceeds to step S33.

In step S33, the application control unit 30 refers to the application control command 54 of the received latest application control information 100, and determines whether or not a different broadcasting start type link app corresponding to a switching destination is currently operable. When the determination result is positive, the process returns to step S23. Then, the processes after step S23 discussed above are executed to start the different broadcasting start type link app corresponding to the switching destination.

On the other hand, when the determination result is negative in step S33, the process proceeds to step S34. In step S34, the different broadcasting start type link app corresponding to the switching destination is not started, and the broadcasting start type link app in execution is ended. Then, the corresponding link application execution process is ended as an error. In this case, switching to the different broadcasting start type link app corresponding to the instruction may be ignored instead of ending of the broadcasting start type link app.

When the determination result is negative in step S32, the process proceeds to step S35. In step S35, the application control unit 30 determines whether or not switching to a web page within the range of the application boundary set by the application boundary and domain unit permission information 101 of the application control information 100 has occurred under the broadcasting start type link app in execution. When the determination result is positive in this step, the process proceeds to step S36. In step S36, the broadcasting start type link app acquires html data or the like of the switching destination from the server of the corresponding domain, and allows display of the corresponding web page.

When the determination result is negative in step S35, the process proceeds to step S37. In step S37, the application control unit 30 determines whether or not the broadcasting start type link app in execution is to be ended. More specifically, it is determined that the broadcasting start type link app in execution is to be ended when the application control command 54 of the received latest application control information 100 is an end command, or when predetermined end operation is given from the user. When the determination result is negative in this step, the process returns to step S24. Then, the steps after step S24 are repeated. On the other hand, when the determination result in step S37 is positive, the application engine 32 ends the broadcasting start type link app in execution under the control of the application control unit 30. As a result, the link application execution process is also ended.

According to the link application execution process discussed herein, execution of receiving device control functions is controllable on the broadcasting side step by step for each of domains of web pages to which a broadcasting start type link app intends to switch based on the application boundary and domain unit permission information 101 of the application control information 100.

The foregoing link application execution process is similarly executed as preprocessing at the time of start of a non-broadcasting start type link application on the receiving device 20 side. In this case, however, the source of supply of the application control information 100 is switched to a predetermined server. Accordingly, when such a configuration is adopted which limits the application control information 100 to be supplied to the receiving device 20 only to the proper application control information 100 authenticated by the broadcasting side, receiving device control functions become controllable step by step on the broadcasting side for each of domains of web pages to which a non-broadcasting start type link app intends to switch.

The foregoing series of processes may be executed either by hardware or by software. When the series of processes are executed by software, programs constituting the software are installed from a program recording medium to a computer incorporated into dedicated hardware, or a general-purpose computer, for example, which is capable of executing various types of functions under various types of programs installed to the general-purpose computer.

Figure 17:
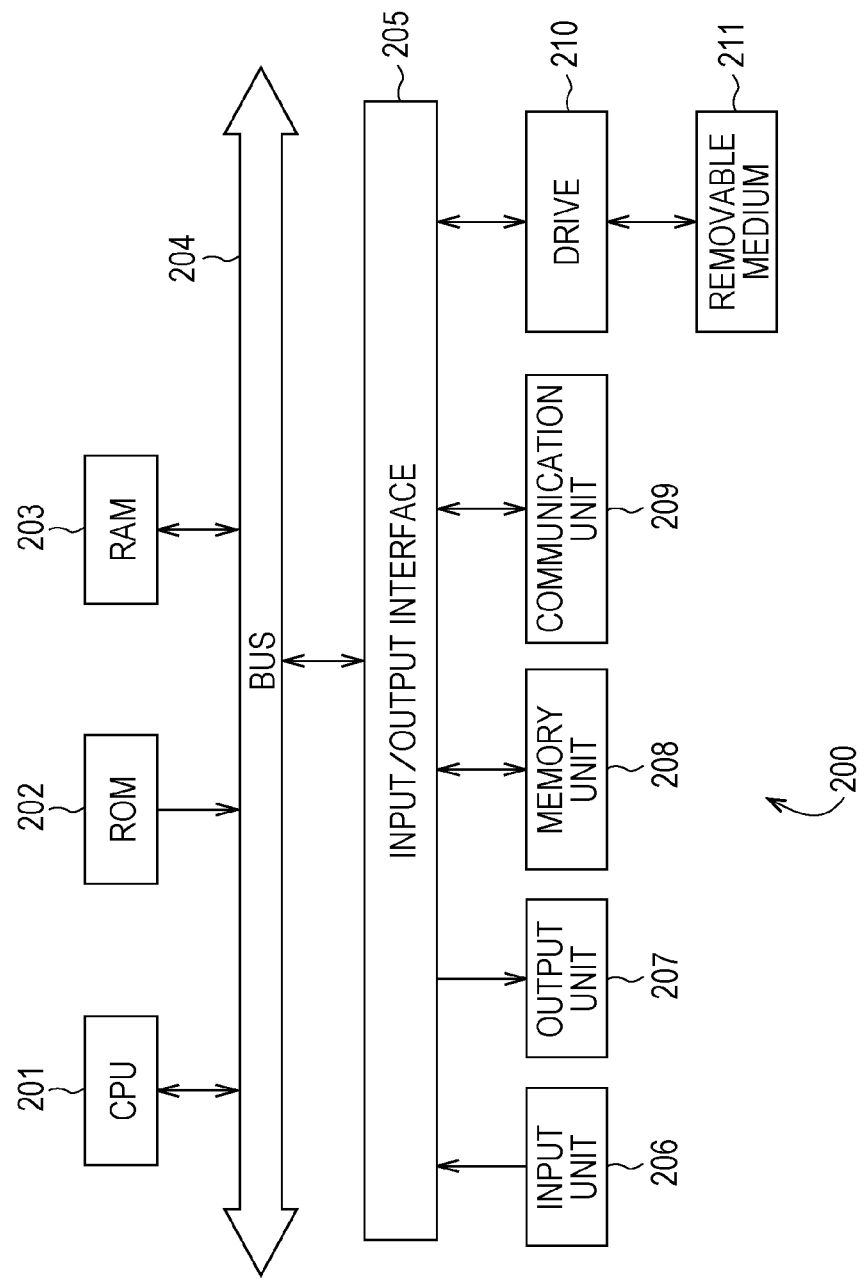
FIG. 17 is a block diagram illustrating a configuration example of a computer.

FIG. 17 illustrates a configuration example of hardware of a computer which executes the foregoing series of processes under programs.

According to a computer 200 thus illustrated, a CPU (Central Processing Unit) 201, a ROM (Read Only Memory) 202, and a RAM (Random Access Memory) 203 are connected with one another via a bus 204.

An input/output interface 205 is further connected with the bus 204. The input/output interface 205 is connected with an input unit 206 constituted by a keyboard, a mouse, a microphone and others, an output unit 207 constituted by a display, a speaker and others, a memory unit 208 constituted by a hard disk, a non-volatile memory and others, a communication unit 209 constituted by a network interface and others, and a drive 210 which drives a removable medium 211 constituted by a magnetic disk, an optical disk, a magneto-optical disk, a semiconductor memory or the like.

According to the computer thus constructed, the CPU 201 loads programs stored in the memory unit 208, for example, to the RAM 203 via the input/output interface 205 and the bus 204, and executes the programs to perform the foregoing series of processes.

The programs executed by the computer may be programs under which the processes are performed in the time series in the order described in the present description, or programs under which the processes are performed in parallel, or at necessary timing such as on occasions of calls.

The programs may be processed by a single computer, or may be distributed among plural computers to be processed by the plural computers. Furthermore, the programs may be transferred to a remote computer to be executed by the remote computer.

In the present description, the system represents the whole apparatus constituted by plural devices.

Embodiments according to the present disclosure are not limited to the embodiments described herein. Various modifications may be made without departing from the scope of the present disclosure.

REFERENCE SIGNS LIST 10 link application control system
11 broadcasting device
12 broadcasting network
13 communicating device
14 IP communication network
20 receiving device
21 broadcasting tuner
22 descrambler
23 CAS module
24 demultiplexer
25 data broadcasting processing unit
26 data broadcasting engine
27 video decoder
28 audio decoder
29 title decoder
30 application control unit
31 IP communication I/F
32 application engine
33 video output unit
34 audio output unit
35 operation input unit
36 control unit
50 application control information (AIT)
61 permission information
71 image reference
72 real time channel selection
73 timer channel selection
74 SI reference
75 current channel selection information acquisition
76 NVRAM Read
77 NVRAM
100 application control information (AIT)
101 application boundary and domain unit permission information
200 computer
201 CPU

The invention claimed is:

1. A receiving device, comprising:
   circuitry configured to:
      receive first content from a broadcasting device, wherein the first content comprises an application URL, permission information, and an application boundary;
      acquire, based on the application URL, a link application linked with the received first content;
      determine state information of the acquired link application;
      execute a device control function of at least one device control function of the acquired link application based on the determined state information;
      determine an agreement of an action of the acquired link application with second content of the permission information, wherein the second content is permitted for the action of the acquired link application, and wherein the action of the acquired link application corresponds to the device control function; and
      control execution of the acquired link application based on the determined agreement,
      wherein the permission information includes a 2-bit image reference associated with a layout of the first content, wherein a value of the 2-bit image reference indicates:
         a first permitted state in which a first image corresponding to the first content is displayed on a sub-screen of a second image, wherein the second image corresponds to the acquired link application, and
         a second permitted state in which the second image is overlaid on the first image,
      wherein the application boundary indicates a range of web pages to which the acquired link application is switchable, and
      wherein the permission information indicates one of permission or prohibition for each device control function of the at least one device control function for the acquired link application.

2. A receiving method, comprising:
   in a receiving device:
      receiving first content from a broadcasting device, wherein the first content comprises an application URL, permission information, and an application boundary;
      acquiring, based on the application URL, a link application linked with the received first content;
      determining state information of the acquired link application;
      executing a device control function of at least one device control function of the acquired link application based on the determined state information;
      determining an agreement of an action of the acquired link application with second content of the permission information, wherein the second content is permitted for the action of the acquired link application, and wherein the action of the acquired link application corresponds to the device control function; and
      controlling execution of the acquired link application the determined agreement,
      wherein the permission information includes a 2-bit image reference associated with a layout of the first content, wherein a value of the 2-bit image reference indicates:

a first permitted state in which a first image corresponding to the first content is displayed on a sub-screen of a second image, wherein the second image corresponds to the acquired link application, and a second permitted state in which the second image is overlaid on the first image, wherein the application boundary indicates a range of web pages to which the acquired link application is switchable, and wherein the permission information indicates one of permission or prohibition for each device control function of the at least one device control function for the acquired link application.

3. A broadcasting device, comprising:

circuitry configured to:

broadcast first content to a receiving device, wherein the first content comprises an application URL, permission information, and an application boundary; and supply, to the receiving device a link application linked with the broadcasted first content that is executable with reception of the broadcasted first content by the receiving device, wherein a device control function of at least one device control function of the link application is executed based on state information of the link application, wherein the execution of the link application is controlled based on an agreement of an action of the link application with second content of the permission information, wherein the second content is permitted for the action of the link application, wherein the action of the link application corresponds to the device control function, wherein the permission information includes a 2-bit image reference associated with a layout of the first content, wherein a value of the 2-bit image reference indicates:

a first permitted state in which a first image corresponding to the first content is displayed on a sub-screen of a second image, wherein the second image corresponds to the link application, and a second permitted state in which the second image is overlaid on the first image, wherein the application boundary indicates a range of web pages to which the link application is switchable, and wherein the permission information indicates one of permission or prohibition for each device control function of the at least one device control function for the link application.

4. A broadcasting method, comprising:

in a broadcasting device:

broadcasting first content to a receiving device, wherein the first content comprises an application URL, permission information, and an application boundary; and supplying, to the receiving device, a link application linked with the broadcasted first content that is executable with reception of the broadcasted first content by the receiving device, wherein a device control function of at least one device control function of the link application is executed based on state information of the link application, wherein the execution of the link application is controlled based on an agreement of an action of the link application with second content of the permission information, wherein the second content is permitted for the action of the link application, wherein the action of the link application corresponds to the device control function, wherein the permission information includes a 2-bit image reference associated with a layout of the first content, wherein a value of the 2-bit image reference indicates:

a first permitted state in which a first image corresponding to the first content is displayed on a sub-screen of a second image, wherein the second image corresponds to the link application, and a second permitted state in which the second image is overlaid on the first image, wherein the application boundary indicates a range of web pages to which the link application is switchable, and wherein the permission information indicates one of permission or prohibition for each device control function of the at least one device control function for the link application.

5. The receiving device according to claim 1, wherein the 2-bit image reference indicates a permission level associated with the layout of the first content.

6. The receiving device according to claim 5, wherein the first image corresponding to the layout of the first content is displayed based on the permission level.

7. The receiving device according to claim 1, wherein the state information of the acquired link application includes at least one of an automatic start, a prefetch, an end, or an action permission.

8. The receiving device according to claim 7, wherein the automatic start corresponds to an acquisition of the link application and a start of the acquired link application prior to the execution of the acquired link application.

9. The receiving device according to claim 8, wherein the prefetch corresponds to the acquisition of the link application prior to the automatic start.

10. The receiving device according to claim 7, wherein the action permission corresponds to execution of a permission state of the acquired link application.

11. The receiving device according to claim 1, wherein the permission information further includes one-bit information that corresponds to NVRAM Read.

12. The receiving device according to claim 1, wherein the permission information further includes one-bit information that corresponds to NVRAM Write.

* * * * *